GILES & McROBERT.
Potato-Digger.

No. 66,145. Patented June 25, 1867.

Witnesses:
Theo Insche
J. A. Service

Inventor:
J. E. Giles
C. S. McRobert
Per Munn & Co.
Attorney

United States Patent Office.

JOEL E. GILES AND CHARLES S. McROBERT, OF MEAD'S MILLS, MICHIGAN.

Letters Patent No. 66,145, dated June 25, 1867.

---

IMPROVEMENT IN POTATO-DIGGERS.

---

*The Schedule referred to in these Letters Patent and making part of the same.*

---

TO ALL WHOM IT MAY CONCERN:

Be it known that we, JOEL E. GILES and CHARLES S. McROBERT of Mead's Mills, in the county of Wayne, and State of Michigan, have invented a new and improved Potato-Digger; and we do hereby declare that the following is a full, clear, and exact description thereof, which will enable others skilled in the art to make and use the same, reference being had to the accompanying drawings, forming part of this specification, in which—

Similar letters of reference indicate like parts.

Our invention has for its object to furnish an improved machine, by means of which the potatoes may be readily and conveniently dug, and separated from the soil raised with and adhering to them; and it consists in the construction of the digger or plough and screen, and in their combination with each other and with the frame of the machine; in the combination of the axle, lever, and chain with each other and with the frame of the machine; and in operating the screen from the drive wheel or wheels of the machine, by means of a crank-wheel shaft and gear-wheels, the whole being constructed and arranged as hereinafter more fully described.

Figure 1:
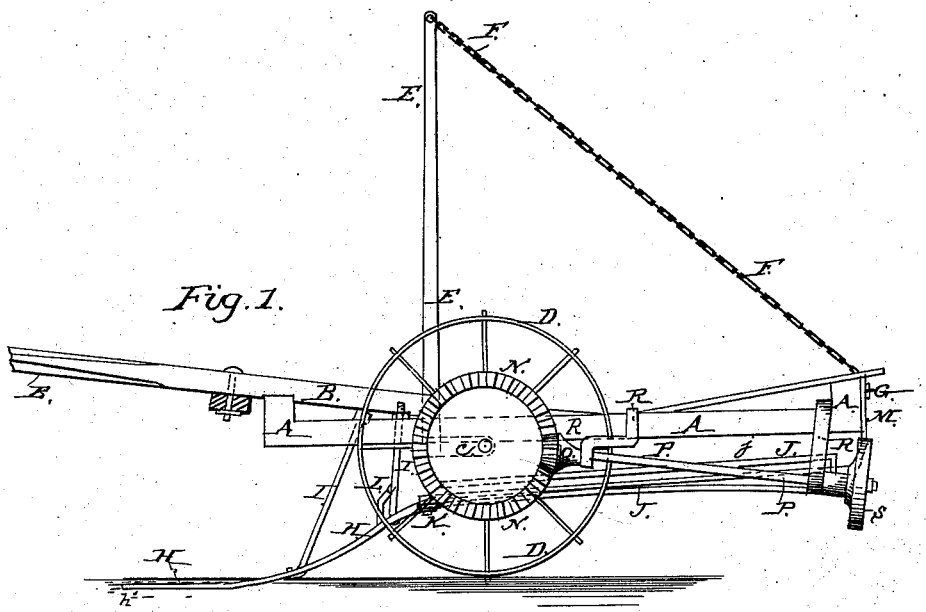
Figure 1 is a side view of our improved machine.
Figure 2:
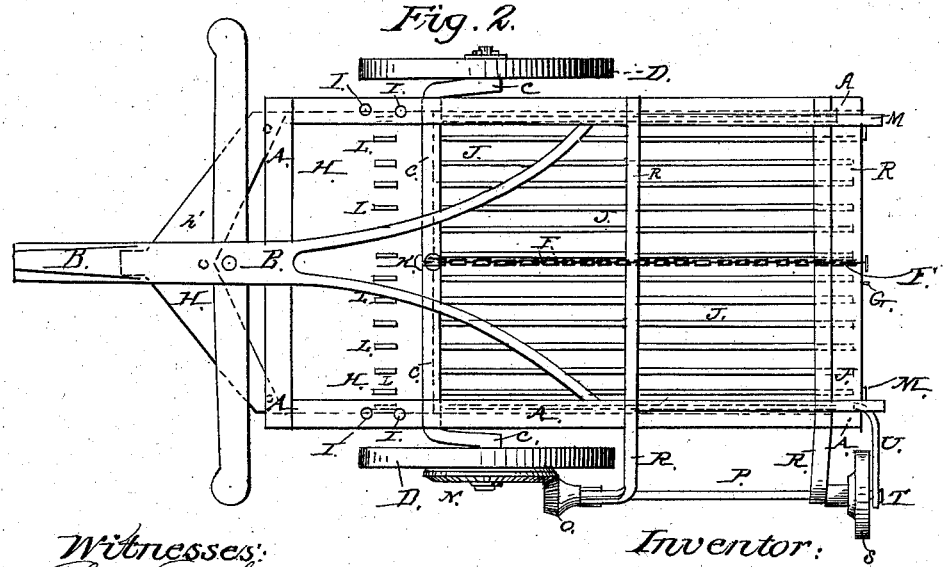
Figure 2 is a top or plan view of the same.

A is the frame of the machine, to which the tongue B is attached in such a way that when the draught is applied the apparatus will be held in a proper working position. C is the axle, which works in bearings in the frame A, near its forward end, and upon which the drive-wheels D revolve. The axle C at the sides of the frame A is bent twice at right angles, so as to have the form of a double crank, as shown in fig. 2. By partially revolving the axle, the frame A may be raised more or less, so as to regulate the depth at which the digger runs, or to raise it entirely from the ground, as may be desired. To the middle part of the axle C is rigidly attached a lever E, having a chain, F, attached to its upper end. The other end of the chain F is attached to the rear end of the frame A, as shown in figs. 1 and 2.

By operating the chain F, the axle C may be adjusted in any desired position. The chain F is secured in place, holding the lever E and axle C in position, by passing one of its links over the pin G, attached to the rear end of the frame A. H is the digger, which is a broad, pointed metallic plate, secured to the forward part of the frame A by rods I, and having a removable point, $h'$, bolted to its forward part or edge. The plate H may, if desired, be replaced by an iron frame or rack, the rods or bars of which should run parallel with the rods of the shaker. These rods I may be made adjustable by cutting screw-threads upon their upper ends, and placing nuts upon them above and below the timbers of the frame A. The digger-plate has a groove formed in its rear edge, in which is pivoted the forward end of the screen or shaker J by a bolt, K, as shown in figs. 1 and 2. L are prongs attached to the upper side of the digger-plate H, near its rear edge, and inclined rearward, so as to break up the earth as it passes up to the screen J, to enable the potatoes to be more readily separated from the earth by the said screen. The rear end of the screen J is supported by the bars or rods M, the lower ends of which are pivoted to the rear end of the screen J, and their upper ends are adjustably pivoted to the rear end of the frame A, so that the pitch of the screw may be regulated as desired. $j$ are the side bars or rods of the shaker, which project above the upper surface of said shaker, and the ends of which should be adjustably attached to the side bars of the shaker-frame, so that the said rods may be adjusted as desired. These said rods keep the potatoes from falling from the sides of the shaker, and compel them to pass off at its rear end. Upon the sides of one or both of the wheels D is formed or attached a bevel gear-wheel, N, into the teeth of which mesh the teeth of the pinion-wheel O, attached to the end of the shaft P, which revolves in bearings formed in the ends of the arms R, attached to the frame A. To the rear end of the shaft P is attached a wheel, S, which acts both as a balance-wheel and as a crank-wheel, to agitate the screen J. The screen J is connected to the wheel S by a crank-pin, T, passing through an arm, U, projecting from the said screen. Several holes are made through the wheel at different distances from its axis, so that the stroke of the screen may be regulated as desired. The rims of the wheels D have spurs formed upon them, to enable them to take a better hold upon the ground, and to prevent their slipping. The drawings represent the device for agitating the screen as being attached to only one side of the machine, but we prefer to attach it to both sides, to prevent side draught. The screen J is formed by attaching longitudinal slats or bars to a rectangular frame.

The rear ends of the said longitudinal slats or bars should be adjustably attached to said frame, so that they may be adjusted to make the surface of the screen more or less concave, as desired.

Having thus described our invention, what we claim as new, and desire to secure by Letters Patent, is—

1. The digger H and screen J, constructed substantially as herein shown and described, in combination with each other, and with the frame A, as and for the purpose set forth.

2. The combination of the axle C, lever E, and chain F with each other and with the frame A, substantially as herein shown and described, and for the purpose set forth.

3. Operating the screen J from the drive-wheel or wheels D, by means of the bevel gear-wheel N, pinion-wheel O, shaft P, wheel S, and arm U, substantially as herein shown and described.

JOEL E. GILES,
CHARLES S. McROBERT.

Witnesses:
W. D. WHALEN,
F. R. BEAL.